United States Patent
Shimoji

[19]

[11] Patent Number: 6,026,102
[45] Date of Patent: Feb. 15, 2000

[54] MULTI ELEMENT SINGLE MODE MICROCHIP LASERS

[76] Inventor: Yukata Shimoji, 2125 University Ct., Clearwater, Fla. 34624

[21] Appl. No.: 08/947,617

[22] Filed: Oct. 9, 1997

Related U.S. Application Data

[63] Continuation-in-part of application No. 08/848,349, Apr. 21, 1997, Pat. No. 5,838,713.

[51] Int. Cl.[7] ............................................ H01S 3/08
[52] U.S. Cl. ................................ 372/22; 372/21; 372/75; 372/98
[58] Field of Search ............................ 372/92, 22, 19, 372/38, 34, 32, 21, 75, 98, 99

[56] References Cited

U.S. PATENT DOCUMENTS

| | | |
|---|---|---|
| 4,809,291 | 2/1989 | Byer et al. . |
| 5,173,799 | 12/1992 | Tanuma . |
| 5,341,388 | 8/1994 | Matsuda et al. ........................... 372/36 |
| 5,355,246 | 10/1994 | Tanuma . |
| 5,377,212 | 12/1994 | Tatsuno et al. . |
| 5,471,493 | 11/1995 | Mirov et al. . |
| 5,487,079 | 1/1996 | Esterowitz et al. . |
| 5,574,740 | 11/1996 | Hargis et al. . |
| 5,651,023 | 7/1997 | MacKinnon . |
| 5,802,086 | 9/1998 | Hargis et al. .............................. 372/22 |
| 5,838,713 | 11/1998 | Shimoji ..................................... 372/92 |
| 5,854,802 | 12/1998 | Jin et al. ..................................... 372/22 |

OTHER PUBLICATIONS

Dixon et al., "Efficient Blue Emission From an Intracavity–Doubled 946–nm Nd:YAG Laser", Optics Letters, vol. 13, No. 2, pp. 137–139 (1988).

Risk et al., "Efficient Frequency Doubling of a Diode–Pumped 946–nm Nd:YAG Laser", Unknown publication by Optical Society of America, pp. 329–331 (1989).

Matthews et al., "Diode pumping of a blue (473 nm) Nd:YAG/KNbO$_3$ microchip laser", Paper CTuP3, Conference on Lasers and Electro–Optics, pp. 174–175 (1996).

Matthews et al., "Blue Microchip Laser Fabricated from Nd:YAG and KNbO$_3$", Optics Letters, vol. 21, No. 3, pp. 198–200 (1996).

Primary Examiner—James W. Davie

[57] ABSTRACT

A microchip laser is formed from at least one portion of laser material and at least one nonlinear crystal. The laser material and nonlinear crystal are in physical contact with each other and an angled surface of either the laser material or the nonlinear crystal forms an air-spaced etalon between the laser material and the nonlinear crystal. The axis of the microchip laser passes through the etalon formed between the laser material and the nonlinear crystal. The etalon in the laser cavity produces a single mode output. Additionally, the nonlinear crystal within the cavity may operate, in conjunction with a polarization dependent gain cross-section in the laser material, as a birefringent filter to reduce the bandwidth of laser emission from a broadband active laser material.

28 Claims, 5 Drawing Sheets

MULTI ELEMENT SINGLE MODE MICROCHIP LASERS

This application is a continuation-in-part of application Ser. No. 08/848,349, now U.S. Pat. No. 5,838,713, entitled "Continuously Tunable Blue Microchip Laser", filed on Apr. 21, 1997, by the same inventor.

BACKGROUND

The present invention is directed generally to a laser, and more particularly to a diode laser-pumped, solid state microchip laser.

Single element, microchip lasers are known for producing single mode outputs when the free spectral range of the laser cavity is larger than the bandwidth of the gain transition in the active material. The interaction between two or more oscillating modes typically produces a noisy laser output, and so single mode operation is advantageous for applications requiring low noise signals.

However, the cavity length is increased when other elements, in addition to the gain medium, are added to the microchip laser cavity. This typically reduces the free spectral range of the cavity to a value less than the gain bandwidth of the active medium, and multi-mode operation results. Multi-mode operation is particularly a problem when it is desired to add a nonlinear component to the microchip laser cavity for generating a frequency other than the fundamental laser frequency.

Multi-mode operation is also a limitation where the gain bandwidth of the active medium is broad, as is usually the case with a tunable laser medium. In such a case, frequency selection elements have to be placed within the laser cavity to produce single longitudinal mode operation, thus complicating the design and manufacture of a tunable, single mode laser.

Therefore, there is a need to produce a microchip laser that can incorporate additional elements for frequency selection and nonlinear frequency generation while still maintaining single mode operation.

SUMMARY OF THE INVENTION

Generally, the present invention relates to a microchip laser formed from at least one portion of laser material and at least one nonlinear crystal. The laser material and nonlinear crystal are in physical contact with each other and an angled surface of either the laser material or the nonlinear crystal forms an etalon between the laser material and the nonlinear crystal. The axis of the microchip laser passes through the etalon formed between the laser material and the nonlinear crystal. Coatings on the outside surfaces of the laser material and the nonlinear crystal provide feedback at one or more wavelengths. The laser cavity produces a single mode output.

Additionally, the nonlinear crystal within the cavity may operate, in conjunction with a polarization dependent gain cross-section in the laser material, as a birefringent filter to reduce the bandwidth of laser emission from a broadband active laser material.

In another embodiment of the invention, a laser includes two or more crystals stacked in contact together where each crystal has a pair of opposing surfaces. Optical coatings are provided on outer surfaces of the crystals positioned at either end of the stack to form one or more laser cavities. A wedged etalon is formed between contacting surfaces of one pair of adjacent crystals.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to a microchip laser that produces a line-narrowed output or a single mode output. The invention is particularly suited to microchip lasers that incorporate intracavity frequency conversion and to microchip lasers that incorporate frequency selection elements to reduce the bandwidth of the output from a laser material having a broad gain bandwidth.

Two Element Laser

Figure 1:
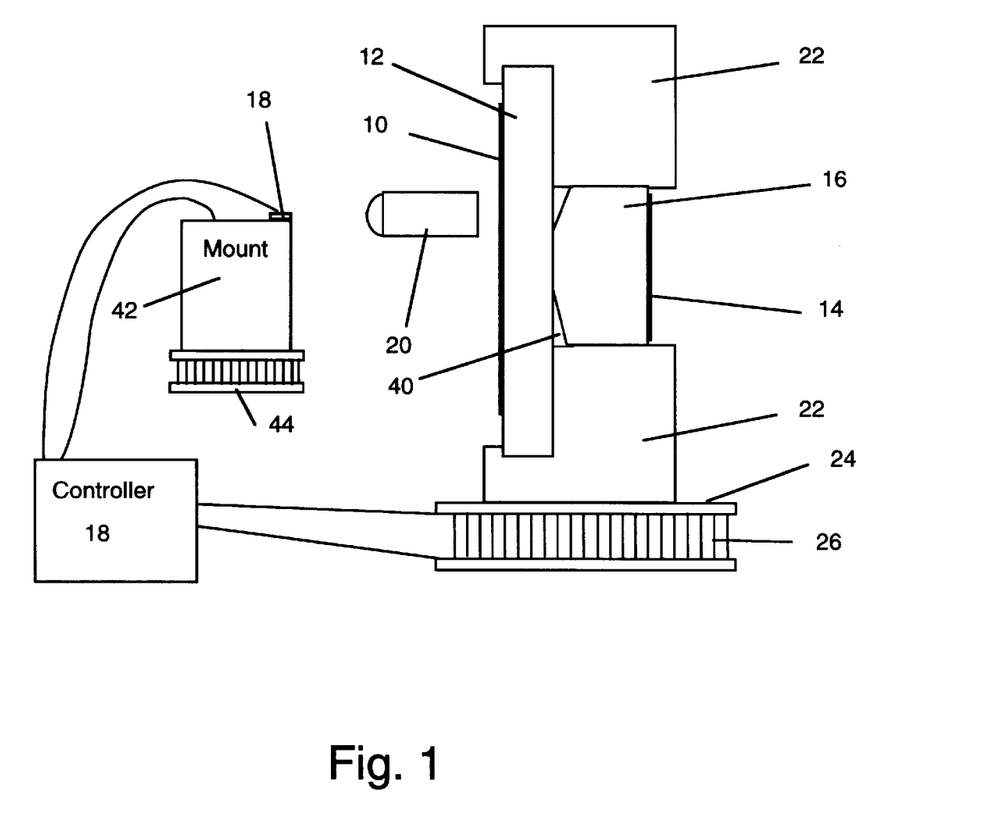
FIG. 1 illustrates a first embodiment of a microchip laser according to the present invention.

FIG. 1 illustrates one particular embodiment of the invention. In this embodiment, a laser cavity is formed between a first coating 10 on an exterior surface of a first crystal 12, and a second coating 14 on an opposite surface of a second crystal 16. The first crystal 12 is a solid-state active laser medium that is optically pumped by, for example, a laser diode 18. Light from the laser diode 18 passes through one or more lenses 20 to focus into the laser crystal 12 and create a population inversion therein. The population inversion provides gain in the laser material at a fundamental wavelength $\lambda_0$. The combination of crystals 12 and 16 is mounted in a thermally-conductive laser mount 22 that is connected to a surface 24 for controlling the temperature of the laser mount 22. For example, the surface 24 may be the top surface of a thermoelectric cooler 26. The supply of current to the laser diode 18 and the thermoelectric cooler 26 is controlled by a controller 28.

The first coating 10 and the second coating 14 are both reflective at the fundamental laser wavelength $\lambda_o$. Furthermore, the first coating 10 readily transmits the pump light, having a wavelength $\lambda_p$, generated by the laser diode 18. The crystallographic orientation of the nonlinear crystal 16 is selected for second harmonic generation of light at wavelength $\lambda_0$ propagating along the axis of the laser formed between the first and the second coatings 10 and 14. The laser material has a polarization dependent gain cross-section and the nonlinear crystal rotates a polarization vector of light propagating therethrough parallel to the axis to selectively feedback to the laser material light of a predetermined wavelength having polarization oriented parallel to a polarization direction of maximum gain in the laser material, so that the fundamental wavelength is equal to the predetermined wavelength.

Figure 2:
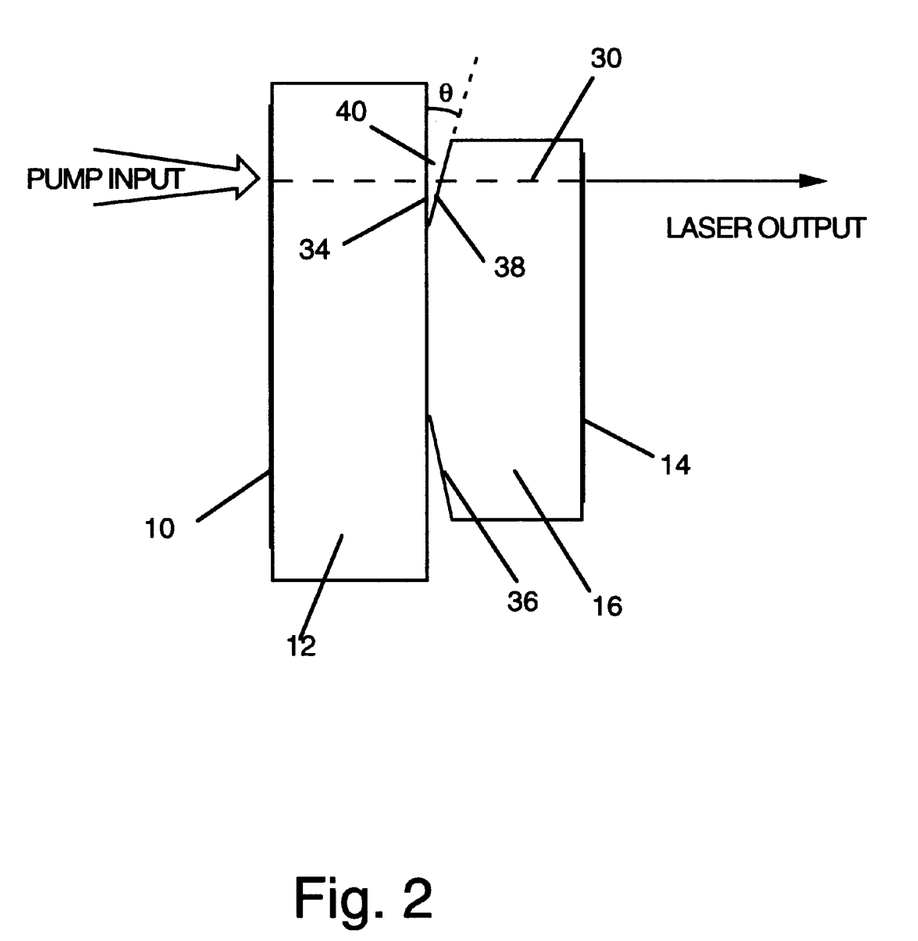
FIG. 2 illustrates an expanded view of the laser cavity illustrated in FIG. 1.

FIG. 2 illustrates the laser crystal and the nonlinear crystal in greater detail. The laser axis 30 (dashed line) is illustrated to extend between the first and second coatings 10 and 14. The pump input, incident from the left side of the laser crystal 12, is received from the laser diode 18 via the focusing lens 20.

The opposing surfaces 34 and 36 of the laser crystal 10 and nonlinear crystal 16 respectively, contact at a contacting portion 32. The opposing surfaces 34 and 36 may be described as interface surfaces of the interface between the laser crystal 10 and the nonlinear crystal 16. The inner surface 36 of the nonlinear crystal 16 is provided with an angled portion 38, resulting in an wedge etalon 40 between the laser crystal 12 and the nonlinear crystal 16. Etalon is defined as a structure formed of only two surfaces belonging to adjacent crystals and forming a space therebetween, and not necessarily including any substance in this space. One example is an air-spaced wedge etalon 40. The laser axis 30 of propagation passes through the wedge 40 etalon. Consequently, the inner laser crystal surface 34 and the angled portion 38 of the inner nonlinear crystal surface 36 combine to act as an etalon, that selects certain optical frequencies within the laser cavity. This kind of gap, in which neither air nor any substance is required within the gap, is shown and described in my prior U.S. Pat. No. 5,838,713. The angle, θ, of the wedge etalon 40, hereinafter referred to as the etalon, may lie in the range 0.1 to 10 mrads, and preferably lies in the range 0.5 to 3 mrads. This arrangement permits the laser to operate on a single longitudinal mode, even though the overall cavity length is sufficiently long that the free spectral range of the cavity is less than the bandwidth of the gain transition in the laser crystal 12. As a result of oscillation on a single longitudinal mode, the noise in the output from the laser is low, typically less than 1%, as described in the following examples.

The inner surface 34 of the laser crystal 12 and the angled portion 38 of the inner surface of the nonlinear crystal 16 may be uncoated, or may be provided with coatings to set the finesse of the etalon 40 at a desired value.

The single longitudinal mode laser operating at wavelength $\lambda_0$ generates a second harmonic signal in the nonlinear crystal 16, having a wavelength of $\lambda_0/2$. The second harmonic radiation escapes through the second coating 14 of the nonlinear crystal 16 to be used as a useful laser output. Due to the bidirectional nature of the circulating laser field at $\lambda_0$, there is a second harmonic signal traveling from the nonlinear crystal 16 into the laser crystal 12. The first coating 10 may reflect the second harmonic signal at $\lambda_0/2$ to direct the second harmonic signal back through the laser cavity and out through the second coating 14 as useful laser output.

The angled portion on the nonlinear crystal 16 may be formed using a number of methods. In one method, the angled portion is formed on the nonlinear crystal 16 during a polishing process. When the nonlinear crystal protrudes from the polishing plate, the lap polishes the crystal to be higher in the center and lower at the edges. The resulting polished surface is not completely flat. When measuring the surface flatness using a Newton's rings method, such a crystal may demonstrate a number of rings, for example 3–20 or more, over a crystal diameter of approximately 3 mm. Where the crystal demonstrates around 12–15 rings, the laser axis may be located at approximately the position of ring numbers 6–8, where the rings are counted outwards from the center of the crystal.

The heat extractor unit, illustrated here as a thermoelectric cooler (TEC) 26 performs two functions. First, the TEC 26 extracts heat from the laser crystal 12 that is deposited by the pump light from the laser diode 18. Also, the TEC 26 maintains the temperature of the nonlinear crystal 16 at the phase match temperature so as to ensure efficient second harmonic generation of the fundamental laser wavelength $\lambda_0$.

Examples of different combinations of laser crystal 12 and nonlinear crystal 16 are provided for further illustration of the invention. Experimental details are provided where available.

EXAMPLE 1

Nd: $YVO_4$/$KNbO_3$ (Blue)

In this first example, the laser crystal is yttrium orthovanadate doped with trivalent neodymium ions (Nd; $YVO_4$) and the nonlinear crystal 16 is formed from potassium niobate ($KNbO_3$).

The first coating 10 on the laser crystal 12 is reflective, preferably highly reflective, at a fundamental laser wavelength, $\lambda_0$, of 914 nm. Likewise, the second coating 14 is reflective, advantageously highly reflective, at the fundamental laser wavelength. The laser oscillates on the $^4F_{3/2}$ to $^4I_{9/2}$ transition of the $Nd^{3+}$ ion which, in the vanadate host, is at 914 nm. The first coating 10 is also reflective at the second harmonic wavelength, namely 457 nm. The second coating 14 is transmissive at 457 nm. Additionally, the first coating 10 is highly transmissive at the pump laser wavelength of 810 nm. Where the coating is stated as being reflective for a given wavelength both here and below, the reflectivity is preferably higher than 99% for that wavelength.

The power of the laser diode is selected according to well known principles that depend on the concentration of neodymium doping within the vanadate crystal, the thickness of the vanadate crystal, and the reflectivity of the coatings 10 and 14 at 914 nm. Typically, the laser diode has an output power in the range 0.3 W to 1.5 W. The focusing lens 20 may be one of a number of known designs for focusing pump light from a laser diode onto a thin slab of laser material. The lens 20 may be a GRIN lens, a GRIN lens with a curved input surface (as illustrated), an aspheric lens, a lens of another geometry, or even a combination of different lenses.

It will be appreciated that the temperature of the laser diode 18 is maintained at a preselected value in order that the pump light emitted by the laser diode 18 lies within the absorption band of the laser crystal 12. The laser diode mount 42 may be attached to a second thermoelectric cooler 44 for removing heat generated by the laser diode 18 and for maintaining the mount 42 and laser diode 18 at the selected temperature to maintain the correct value of $\lambda_p$.

EXAMPLE 2

Nd:$YVO_4$/KTP (Green)

Where the first coating 10 and the second coating 14 are reflective at the fundamental wavelength of 1064 nm, the laser oscillates at the fundamental wavelength of 1064 nm.

The crystallographic orientation of the nonlinear crystal 16 is selected for phase matching light at 1064 nm propagating along the axis 30 of the laser cavity for second harmonic generation. This configuration results in the generation of a green second harmonic output at 532 nm. The first coating 10 may be reflective at 532 nm so as to reflect the green light propagating in the direction towards the pump laser diode 18 back through the second coating 14 of the nonlinear crystal 16. The nonlinear crystal 16 may be formed from potassium niobate, potassium titanyl phosphate (KTP), β-barium borate (BBO), lithium borate (LBO), or other suitable nonlinear material. In this example, KTP was used.

With a pump power of 1 W from the laser diode, and using a neodymium vanadate laser crystal 12 having a thickness of 0.4 mm, and a KTP nonlinear crystal 16 having a length of 1.2 mm, an output power at 532 nm of 250 mW was obtained. The cross-sectional areas of the laser crystal 12 and nonlinear crystal 16 were 4 mm×4 mm and 3 mm×3 mm respectively. The neodymium vanadate crystal was doped at a level of 1%. Here, the KTP crystal was type II phase-matched for frequency doubling. The reflectivity of the first coating 10 at 1064 nm was approximately 99.9% and at 532 nm was approximately 10%. The reflectivity of the second coating 14 at 1064 nm was approximately 99.5% and at 532 nm was approximately 5%. The KTP crystal was cut for phase-matching at approximately 25° C. It was found that the green output power fell by less than 10% when the temperature was tuned by ±5° C. The noise level of the 532 nm output signal was better than 0.5%.

EXAMPLE 3

Nd:YAG/KNbO₃ (Blue)

In this third example, the laser crystal 12 was a 1.5 mm thick crystal of Nd:YAG (neodymium yttrium aluminum garnet), doped at a level of 1.1%. The laser crystal 12 had a diameter of approximately 7 mm. The nonlinear crystal 16 was formed from $KNbO_3$. A number of nonlinear crystals 16 were used, with lengths ranging from 1 to 3 mm. The cross-section of the different nonlinear crystals 16 were 3 mm×3 mm.

The laser diode 18 emitted approximately 1 W of pump light, approximately 700 mW of which was incident on the face of the laser crystal 12. The first and second coatings 10 and 14 were reflective at 946 nm. The laser oscillated on the $^4F_{3/2}$ to $^4I_{9/2}$ transition of $Nd^{3+}$ in YAG at 946 nm, and produced a second harmonic signal at 473 nm. It was observed that the fundamental signal in the neodymium YAG laser was preferentially polarized, as has been observed elsewhere.

The second harmonic signal was measured to have a power up to 50 mW. It was found that the power in the second harmonic signal was not strongly dependent on the length of the nonlinear crystal 16, between 1 mm and 3 mm, but depended more strongly on the quality of the nonlinear crystal 16 and the quality of the coatings 10 and 14. The level of noise in the output was approximately 0.2%.

In Examples 1, 2, and 3, the laser oscillates on a single longitudinal mode, and the second harmonic signals are also single-frequency signals.

EXAMPLE 4

Cr:LiSAF/KNbO₃ (Tunable Blue)

In a fourth example of the embodiment illustrated in FIG. 1, the laser crystal 12 is formed from a 1-mm thick slice of Cr:LiSAF (chromium doped in lithium strontium aluminum fluoride. The chromium was doped at a level of 10%, and transmitted approximately 1% of the pump beam from the laser diode 18. In this example, the laser diode 18 emitted up to 300 mW at 670 nm. It is believed that a lower doping level, approximately 2%, may be result in more uniform heat deposition within the laser crystal 12, with reduced thermal effects.

The nonlinear crystal 16 was formed from $KNbO_3$, and had a length between 1 and 3 mm. The cross-section of the $KNbO_3$ crystal was 3 mm×3 mm. The crystallographic orientation of the $KNbO_3$ crystal was selected for phase matching second harmonic generation at 860 nm at room temperature.

The first coating 10 on the laser crystal 12 was a broad-band reflector centered at 860 nm. The second coating 14 on the nonlinear crystal 16 was a broad-band reflector centered at 860 nm, and was transmissive at 430 nm to permit output of the second harmonic signal.

The laser had a threshold pump power of approximately 60 mW. At a pump level of 300 mW, a second harmonic output of 5 mW was obtained.

The phase-matching temperature of the potassium niobate crystal was varied from 25° C. to 40° C., and produced a corresponding shift in the wavelength of the output beam from 425 nm to 430 nm, respectively. The output power varied by less than 10% over this tuning range. The stability of the output power was better than 1%, and was a single-frequency output, corresponding to single-mode operation of the laser at approximately 860 nm.

Cr:LiSAF exhibits gain over a large wavelength range, typically 750 nm to 1000 nm, and requires frequency selection within the laser cavity to produce a narrowband output. Here, frequency selection was provided by the nonlinear crystal 16 which operates as a birefringent filter. The stimulated emission cross-section in Cr:LiSAF is polarization-dependent. Therefore, that wavelength band which experiences the highest gain is that band which is rotated by approximately $n\pi$ on a single round trip through the cavity, where n is an integer. Thus, the combination of birefringence in the nonlinear crystal 16 and a preferred polarization axis or vector direction of maximum gain in the laser crystal 16 results in line narrowing of the oscillating wavelength band around the fundamental laser wavelength $\lambda_0$. The laser also contains an air-spaced etalon 40. It is believed that the combination of the birefringent effect of the nonlinear crystal 16 and the etalon is sufficient to produce oscillation of the Cr:LiSAF laser on a single longitudinal mode.

The birefringent effect on the nonlinear crystal 16 may be used for line-narrowing emission from other broad-band laser media that have a polarization-dependent gain cross-section axis perpendicular to the laser axis 30. Such materials may include Cr:LiCAF (lithium calcium aluminum fluoride), Cr:LiSGaF (lithium strontium gallium fluoride) and $Ti:Al_2O_3$ (titanium doped in sapphire). Additionally, the nonlinear crystal 16 may be made of a different material, such as LBO, BBO, KTP and various isomorphs thereof.

Three Element, Single Cavity Laser

Figure 3:
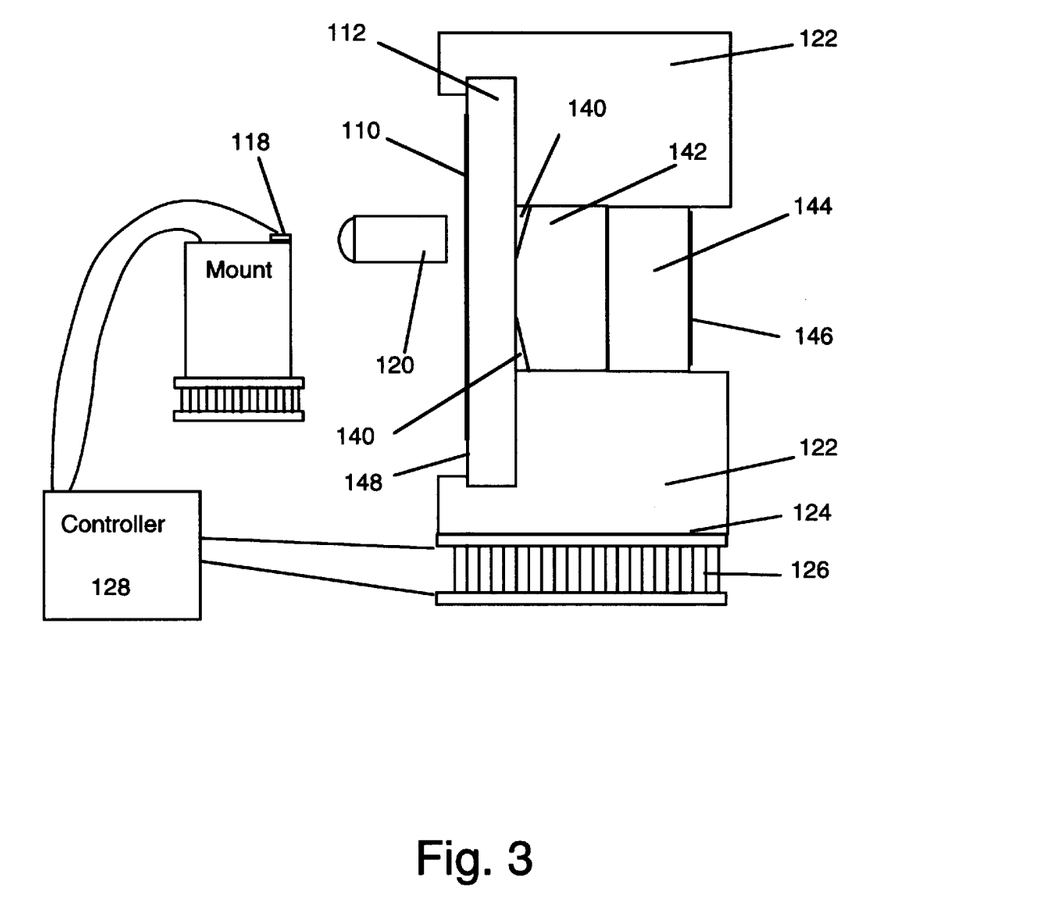
FIG. 3 illustrates a second embodiment of a microchip laser according to the present invention.

FIG. 3 illustrates another embodiment of the invention in which the laser is formed from three component parts. These component parts are a laser crystal 112, a first nonlinear crystal 142, and a second nonlinear crystal 144. The crystals 112, 142, and 144 are held in contact with each other. The outer surface 148 of the laser crystal 112 is provided with a first coating 110. The outer surface of the second nonlinear crystal 144 is provided with a second coating 146. An air-spaced etalon 140 is present between the laser crystal 112 and the first nonlinear crystal 142, in a manner similar to that illustrated in FIGS. 1 and 2. The laser cavity in this case is formed between the first and second coatings 110 and 146. The inclusion of two nonlinear crystals within the cavity permits two nonlinear processes to take place.

A laser diode 118 produces light at a wavelength suitable for pumping the laser crystal 112, and the light is focused into the laser crystal 112 by a lens 120. The crystals 112, 142 and 144 are held in a thermally conductive mount 122 that is attached to a cooling surface 124 of a TEC 126. The laser diode 118 and TEC 126 are powered and controlled by a controller 128.

EXAMPLE 5

Nd:YAG/KN$_b$O$_3$/LBO (UV)

In this example, the first nonlinear crystal may be crystallographically oriented for frequency doubling the fundamental laser wavelength, $\lambda_o$. The second nonlinear crystal 144 may be crystallographically oriented for phase-matched sum frequency mixing, in order to add the fundamental and second harmonic wavelengths to produce the third harmonic of the fundamental laser wavelength.

In illustration, the laser crystal 112 may be a Nd:YAG crystal, typically having a length in the range of 0.5 to 2 mm, although the invention is not restricted to this range of length. The first nonlinear crystal 142 may be KNbO$_3$ for generating the second harmonic of the fundamental 1064 nm laser radiation. The first coating 110 and the second coating 146 are both reflective at 1064 nm and 532 nm so as to increase the intracavity intensity at the wavelengths. The second nonlinear crystal 144 may be an LBO crystal oriented for phase-matching sum-frequency mixing of 1064 and 532 nm light in order to generate the third harmonic of the fundamental laser radiation at 355 nm. The second coating 146 is transmissive at the third harmonic wavelength of 355 nm. Advantageously, the first coating 110 is reflective at 355 nm.

Figure 4:
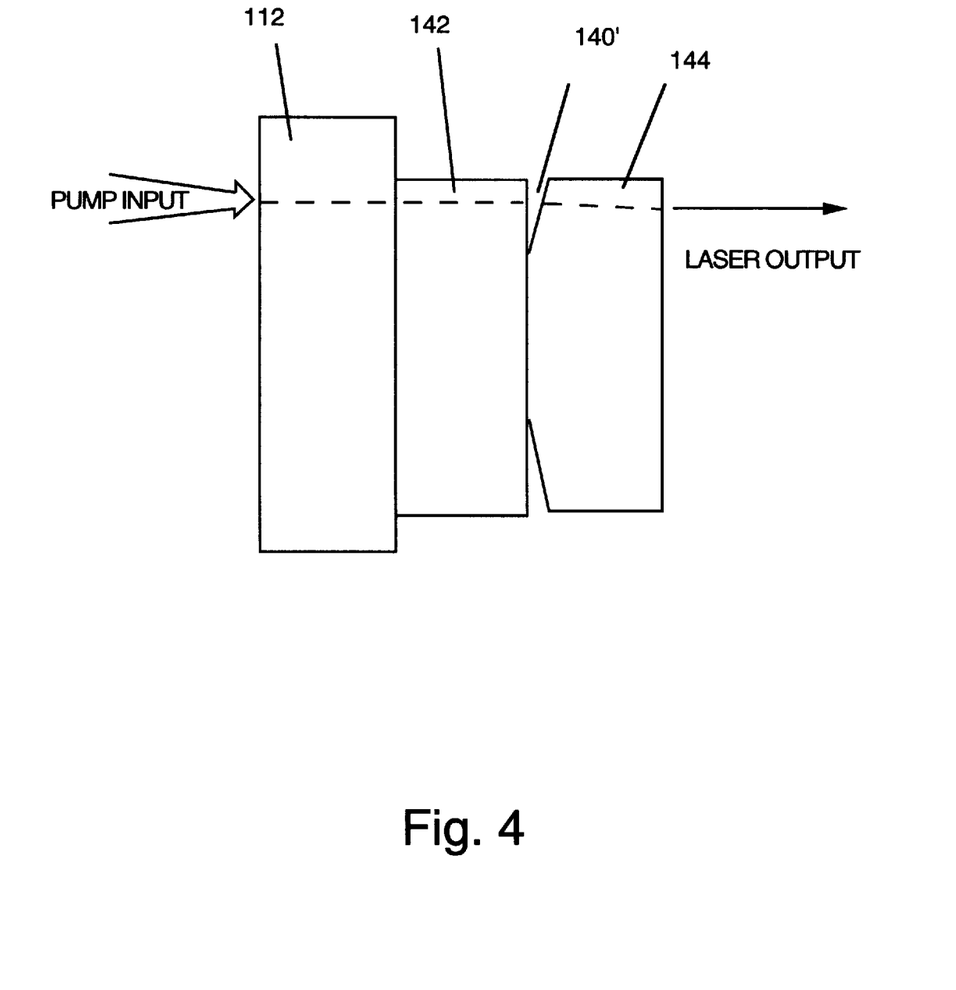
FIG. 4 illustrates an expanded view of the laser cavity shown in FIG. 3.

The air-spaced etalon 140 for maintaining single longitudinal mode operation of the laser may also be provided between the first and second nonlinear crystals 142 and 144 as illustrated in FIG. 4. The etalon between the first and second nonlinear crystals 142 and 144 is shown as 140'.

EXAMPLE 6

Nd:YAG/KTP/KNbO$_3$ (Optical Parametric Oscillator)

The embodiments illustrated in FIGS. 3 and 4 may also be employed in an optical parametric oscillator configuration. In this configuration, the laser crystal 112 is the active medium, the first nonlinear crystal 142 is a frequency-doubling crystal to produce the second harmonic of the fundamental laser wavelength, and the second nonlinear crystal 144 is crystallographically oriented for phase-matching an optical parametric operation.

The laser operates in the following manner. Laser oscillation takes place between the first coating 110 and the second coating 146, to generate the fundamental laser wavelength $\lambda_0$. The first nonlinear crystal 142 generates the second harmonic of the fundamental laser wavelength at 2$\lambda_0$. The signal at 2$\lambda_0$ circulates around the cavity by reflecting off the coatings 110 and 146, both of which are reflective at this wavelength. The second harmonic signal generates idler and signal wavelengths at $\lambda_I$ and $\lambda_S$, respectively in the second nonlinear crystal 144. It will be appreciated that these wavelengths are determined according to the relation $$\frac{2}{\lambda_0} = \frac{1}{\lambda_1} + \frac{1}{\lambda_2}.$$

The first and second coatings 110 and 146 may also be reflective at the idler wavelength, so as to resonate the idler and thereby generate a stronger signal at $\lambda_S$.

In an illustration of this embodiment, the laser crystal 110 is formed from Nd:YAG, typically having a thickness between 0.5 and 2 mm, although the invention is not limited to this range. The first nonlinear crystal 142 may be formed from KTP for frequency doubling the fundamental Nd:YAG wavelength of 1064 nm to produce a second harmonic signal at 532 nm. The 532 nm light propagates around the laser cavity by reflection off the first and second coatings 110 and 146. The second nonlinear crystal is formed from KNbO$_3$ and is temperature phase-matched, typically to produce an idler signal having a wavelength ranging from approximately 3.4 $\mu$m to 4.2 $\mu$m, and a signal at $\lambda_S$, typically ranging from approximately 610 nm to 630 nm. It will be appreciated that other nonlinear crystals may be used, according to the fundamental wavelength available and the desired output frequency. Temperature tuning of the second nonlinear crystal 144 results in tuning of the idler and signal wavelengths. The extent of temperature-tuning the second nonlinear crystal 144 may be limited by the phase-match range of the first nonlinear crystal 142 for second harmonic generation.

Three Element, Dual-Cavity Laser

Figure 5:
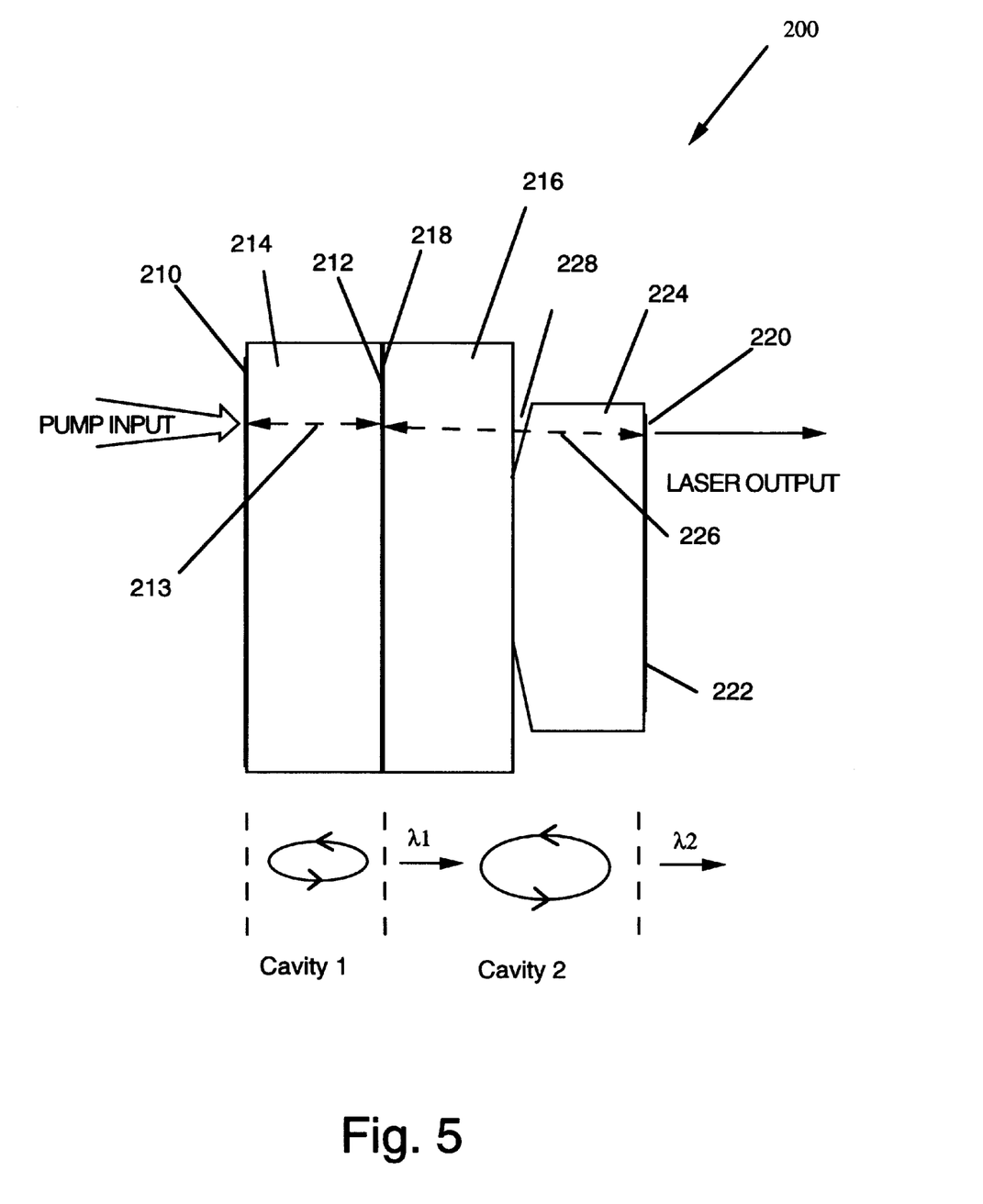
FIG. 5 illustrates a third embodiment of a microchip laser according to the present invention.

FIG. 5 illustrates another embodiment of the invention, in which a three-component system forms two isolated laser cavities. The first laser cavity is used to produce light at a first wavelength $\lambda$1 that then pumps a second laser material in the second laser cavity to generate a second laser wavelength, $\lambda$2. Referring now to the figure, the external components, including the laser mount, focusing lens, thermoelectric coolers and pump laser diode are the same as illustrated in FIG. 3 and are omitted for clarity.

The first laser cavity is formed between coatings 210 and 212 on respective first and second surfaces of a laser crystal 214. In this embodiment, the pump light received from a pumping laser diode is incident on the first coating 210 of the first laser crystal 214. The pump light is absorbed within the first laser crystal 214 to create a population inversion that results in optical gain at the first wavelength $\lambda$1. Oscillation takes place between the coatings 210 and 212, along the first laser axis 213, and the output from the first laser crystal 214 at $\lambda$1 enters the second laser crystal 216.

The second laser cavity is formed between a third coating 218 on the second laser crystal 216 and a fourth coating 220 on the output surface 222 of the nonlinear crystal 224. The light at wavelength $\lambda$1 is absorbed in the second laser crystal 216 to create a population inversion that produces gain at the second wavelength $\lambda$2. The coatings 218 and 220 are reflective at $\lambda$2 so that the second laser oscillates at lambda 2.

The nonlinear crystal 224 is crystallographically oriented for phase matching a nonlinear interaction, such as second harmonic generation, for light at wavelength $\lambda$2 directed along the second laser axis 226. The wedge etalon 228 between the second laser crystal 216 and the nonlinear crystal 224 provides single mode selection at $\lambda$2. The second harmonic signal at $\lambda$2/2 within the second laser cavity is transmitted through the second coating 220 as useful laser output.

For illustration, this laser 200 may be formed using Nd:YAG as the first laser material 214, Cr:Mg$_2$SiO$_4$ as the second laser material 216, and KNbO$_3$ as the nonlinear crystal 224. The coatings 210 and 212 provided on the first laser crystal 214 are selected for oscillation of the first laser on the first laser axis 213 at 1064 nm. Light at λ1 equals 1064 nm and is absorbed by the second laser crystal 216 of Cr:Mg$_2$SiO$_4$. The Cr:Mg$_2$SiO$_4$ laser oscillates with a wavelength of λ2 in the range 1130 nm. to 1370 nm. The coatings 218 and 220 are broad band reflecting coatings covering this range. The KNbO$_3$ nonlinear crystal 224 operates as a birefringent filter to reduce the bandwidth of the oscillating wavelength λ2, in a manner similar to that described above with reference to Example 4. The nonlinear crystal 224 may be temperature tuned for second harmonic generation over at least a portion of the range 565 nm to 684 nm.

In another embodiment, the broad band reflective coating 218 may be omitted, and the coating 210 on the first laser crystal made to be reflective over the range 1130 nm to 1368 nm. In this embodiment, cavity 1 is incorporated within cavity 2. The broadband reflective coating 210 may also be made to be reflective at 565 to 684 nm to reflect the second harmonic signal from the second cavity out through the output surface 222.

In another embodiment, the coating 212 may be reflective at both λ1 and λ2, to form two non-overlapping cavities. Where the second laser cavity includes either of coatings 210 or 212, the etalon 228 may also be formed between the first and second laser crystals 214 and 216.

In another embodiment of a dual-cavity microchip laser, the first wavelength, λ1, used for pumping the second laser may be generated from the second harmonic signal of the first laser operating at λ$_0$. In this embodiment, the first laser includes two crystals, and its output is used to pump a second laser, which may be a single component microchip laser, or a multiple component microchip laser.

While various examples were provided above, the present invention is not limited to the specifics of the examples. For example, the air-spaced etalon may be formed by an angled portion on either or both of the crystals surrounding the etalon. Also, the active laser material may be formed from a noncrystalline material, and need not be restricted to being crystalline.

As noted above, the present invention is applicable to microchip lasers. It is believed to be particularly useful in applications where single frequency output or low noise output are required. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. A laser, comprising:
   a portion of laser material along a laser light propagation axis having a first opposing surface and a second opposing surface, the first surface being provided with a first coating reflective at a fundamental wavelength of light produced by the laser material; a pump laser being electrically connected to a supply of electric current through a controller, the pump laser being oriented such that pump light produced by the pump laser shines on the first surface and pumps the laser material to produce the fundamental wavelength of laser light; an optically nonlinear crystal having a third opposing surface and a fourth opposing surface, a part of the third surface optically contacting the second surface of the portion of laser material, the fourth surface being provided with a second coating reflective at the fundamental wavelength and being located distal to the pump laser, so as to form a laser cavity between the first coating and the second coating, the laser cavity operating along the laser light propagation axis, and the nonlinear crystal being crystallographically oriented relative to the axis and to a polarization vector direction of maximum gain so as to phase-match a nonlinear interaction with light at the fundamental wavelength essentially parallel to the propagation axis; and an etalon formed on the propagation axis between the laser material and the nonlinear crystal, the etalon being formed by a portion of the second surface and a portion of the third surface.

2. The laser according to claim 1, wherein the etalon has a wedge shape with an angle ranging from 0.1 mrad to 10 mrad.

3. The laser according to claim 2, wherein the angle ranges from 0.5 mrad to 3 mrad.

4. The laser according to claim 1, wherein the second surface contacts the third surface at a contact point, the contact point lying outside a fundamental transverse mode of the laser cavity.

5. The laser according to claim 1, further comprising a pump laser diode to generate pump light, a focusing assembly positioned between the laser diode and the first surface to focus the pump light in the laser material, a thermally controllable mount that holds the laser material and the nonlinear crystal and a controller the controller being attachable to the laser diode to supply current thereto and attachable to the thermally controllable mount to control a temperature of the mount.

6. The laser according to claim 1, wherein the etalon in the laser cavity has a thickness lying in the range from 0.5 μm to 10 μm.

7. The laser according to claim 1, wherein the first coating and the second coating are highly reflective at the fundamental wavelength, and the second coating transmits light at a second harmonic wavelength of the fundamental wavelength.

8. A laser according to claim 1, wherein the laser material is a crystal doped with Nd$^{3+}$ ions, the nonlinear crystal is potassium niobate, and the fundamental wavelength corresponds to the $^4F_{3/2}$–$^4I_{9/2}$ transition in the Nd$^{3+}$ ions, and the nonlinear crystal is crystallographically oriented to the propagation axis and to the polarization vector direction of maximum gain such that it is phase-matched to generate a second harmonic wavelength of the fundamental wavelength.

9. A laser according to claim 1, wherein the nonlinear crystal is formed of one of the group consisting of potassium niobate, potassium titanyl phosphate lithium borate, β-barium borate, and isomorphs thereof.

10. A laser, comprising:
    a pump laser electrically connected to a supply of electric current through a controller to generate a pumping light; a laser material oriented such that the pumping light shines in and stimulates the laser material to emit laser light having a preferred polarization, the laser material having a first opposing surface and a second opposing surface, the first surface being provided with a coating reflective at a fundamental wavelength of the laser light generated by the laser material; and a birefringent crystal having a third surface and a fourth surface, the fourth surface being provided with a coating reflective at the wavelength of the laser light to form a laser cavity between the first surface and the fourth surface, the laser cavity having a laser light propagation axis; part of the second surface of the laser material and part of the third surface of the birefringent crystal forming a wedge etalon therebetween.

11. The laser according to claim 10, wherein the birefringent crystal is formed of an optically nonlinear material crystallographically being oriented relative to the propagation axis and to a polarization vector direction of maximum gain, so as to phase-match a frequency doubling of the laser light propagating essentially along the axis, and the second coating transmits light at half the wavelength of the laser light.

12. The laser according to claim 10, wherein the etalon has a wedge shape with an angle ranging from 0.1 mrad to 10 mrad.

13. The laser according to claim 12, wherein the angle ranges from 0.5 mrad to 3 mrad.

14. The laser according to claim 10, wherein the second surface contacts the third surface at a contact point, the contact point lying outside a fundamental transverse mode of the laser cavity.

15. The laser according to claim 10, wherein the pump laser is a laser diode, further comprising a focusing assembly positioned between the laser diode and the first surface to focus the pumping light in the laser material, a thermally controllable mount that holds the laser material; the nonlinear crystal and the controller the controller being attachable to the laser diode to supply current thereto and attachable to the thermally controllable mount to control a temperature of the mount.

16. The laser according to claim 10, wherein a thickness of the etalon in the laser cavity ranges from 0.5 $\mu$m to 10 $\mu$m.

17. The laser according to claim 10, wherein the laser material is selected from the group consisting of Cr:LiSAF, Cr:LiCAF and Cr:LiSGaF and the birefringent crystal is formed from a material selected from the group consisting of $KNbO_3$, KTP, LBO, BBO, and isomorphs thereof.

18. A laser comprising:
   a pump laser electrically connected to a controller to supply and control electric current to the pump laser to generate a pumping light; a portion of laser material along a laser light propagation axis having a first opposing surface and a second opposing surface, the first surface being provided with a first coating reflective at a fundamental wavelength of laser light produced by the laser material, upon being pumped by the pumping light; a first optical crystal having a third opposing surface and a fourth opposing surface, the third surface contacting the second surface of the portion of laser material to form a first interface; a second optical crystal having a fifth opposing surface and a sixth opposing surface, the fifth surface contacting the fourth surface of the first optical crystal to form a second interface, the sixth surface being provided with a second optical coating; an air-spaced etalon being formed on the axis at one interface selected from the group consisting of the first interface and the second interface, the etalon being formed only of adjacent surfaces.

19. A laser as recited in claim 18, wherein the second coating is reflective at the fundamental wavelength so as to form a laser cavity between the first coating and the second coating, the laser cavity having the laser axis passing through the etalon, the first crystal and the second crystal are both optically nonlinear crystals.

20. A laser as recited in claim 19, wherein the first optical crystal is crystallographically oriented relative to both the laser axis and a polarization vector direction of maximum gain to phase-match second harmonic generation of light at the fundamental wavelength propagating along the laser axis, so as to produce a second harmonic wavelength.

21. A laser as recited in claim 20, wherein the second optical crystal is crystallographically oriented relative to the laser axis to phase match sum-frequency mixing of light of the fundamental wavelength and the second harmonic wavelength propagating along the laser axis so as to generate a third harmonic wavelength, and the second coating is reflective at the fundamental and second harmonic wavelengths.

22. A laser as recited in claim 20, wherein the second optical crystal is crystallographically oriented relative to the laser axis for phase matching optical parametric generation of light at the second harmonic wavelength propagating along the laser axis, and the second coating is reflective at the fundamental wavelength.

23. A laser as recited in claim 18, wherein the second surface is provided with a third coating reflective at the fundamental wavelength such that a first laser cavity is formed between the first coating on the first surface and the third coating on the second surface, the first laser cavity has a first laser axis, the first optical crystal is a laser crystal that absorbs light at the fundamental wavelength, a fourth optical coating is provided on one surface selected from the group consisting of: the third surface of the first optical crystal; the first surface; and the second surface, the second coating and the fourth coating are reflective at a second laser wavelength to form a second laser cavity therebetween, the second laser cavity has a second laser axis essentially coextensive with the first axis, and the second optical crystal is a nonlinear optical crystal crystallographically oriented to both the second laser axis and a polarization vector direction of maximum gain in the laser material for phase-matching a nonlinear optical laser generation using light generated in the second laser cavity at the second laser wavelength propagating along the second laser axis.

24. A laser as recited in claim 23, wherein the fourth optical coating is on the third surface of the first optical crystal, and the etalon is formed at the second interface between the first crystal and the second optical crystal.

25. A laser comprising:
   at least two crystals of laser material being stacked in contact together to form a stack, each of the crystals having a pair of opposing surfaces, a first optical coating and a second optical coating being provided on respective outer surfaces of end crystals at each end of the stack for use as laser cavity mirrors; a pump laser electrically connected to a supply of electric current through a controller to supply and control the current to the pump laser to generate a pump laser light; and a wedge etalon formed by and between a portion of adjacent surfaces of one pair of the crystals along a laser light propagation axis, the portion of adjacent surfaces forming a space therebetween having a wedge shape.

26. The laser as recited in claim 25, wherein the etalon has an angle of at least 0.5 mrad.

27. The laser as recited in claim 25, wherein the first coating and the second optical coating form a first laser cavity.

28. The laser as recited in claim 25, wherein the first optical coating forms a second laser cavity with a third optical coating disposed on a third surface on a crystal of the stack, the third surface being within the stack.

* * * * *